(12) United States Patent
Zhang et al.

(10) Patent No.: US 8,635,681 B2
(45) Date of Patent: Jan. 21, 2014

(54) METHOD AND SYSTEM TO AUTHORIZE AND ASSIGN DIGITAL CERTIFICATES WITHOUT LOSS OF PRIVACY, AND/OR TO ENHANCE PRIVACY KEY SELECTION

(75) Inventors: Tao Zhang, Fort Lee, NJ (US); Eric Van Den Berg, Hoboken, NJ (US); Andrew Burnette, Red Bank, NJ (US); Giovanni Di Crescenzo, Madison, NJ (US); Richard Ferrer, Hillsborough, NJ (US); Stanley Pietrowicz, Freehold, NJ (US); Robert G. White, Morristown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 748 days.

(21) Appl. No.: 12/012,454

(22) Filed: Feb. 1, 2008

(65) Prior Publication Data

US 2010/0031025 A1 Feb. 4, 2010

Related U.S. Application Data

(60) Provisional application No. 60/899,073, filed on Feb. 2, 2007, provisional application No. 60/918,741, filed on Mar. 19, 2007.

(51) Int. Cl.
*H04L 9/32* (2006.01)
*H04K 1/00* (2006.01)

(52) U.S. Cl.
USPC ............................... 726/6; 713/168; 380/270

(58) Field of Classification Search
USPC .......... 713/156, 157, 155, 176, 170; 380/286, 380/270, 30; 726/1–36
See application file for complete search history.

(56) References Cited

U.S. PATENT DOCUMENTS

| 5,717,758 | A  | * | 2/1998  | Micall ........................... 713/158 |
| 6,370,249 | B1 | * | 4/2002  | Van Oorschot ............... 380/277 |
| 6,904,523 | B2 | * | 6/2005  | Bialick et al. ................. 713/156 |
| 6,978,017 | B2 | * | 12/2005 | Wiener et al. ................... 380/30 |
| 7,197,637 | B2 | * | 3/2007  | Schmidt et al. ............... 713/157 |

(Continued)

OTHER PUBLICATIONS

Taekyoung Kwon, Jung Hee Cheon, Yongdae Kim, and Jae-Ii Lee, "Privacy Protection in PKIs: A Separation-of-Authority Approach", Information Security Applications, 7th International Workshop, WISA 2006, Jeju Island, Korea, Aug. 28-30, 2006, Revised Selected Papers 2007.*

(Continued)

*Primary Examiner* — Carl Colin
*Assistant Examiner* — S. Ali Zaidi
(74) *Attorney, Agent, or Firm* — Philip J. Feig

(57) ABSTRACT

A method and system for public key infrastructure key and certificate management provides anonymity to certificate holders and protects the privacy of certificate holders from the compromise of a certificate authority. Functional separation is provided in the authorization of a certificate request and the assignment of certificates and key pairs. The authorizing certificate authority approves or denies each certificate request from a requestor whose identity is not made available to the assigning certificate authority. The assigning certificate authority, upon approval from the authorizing certificate authority, issues one or more certificates and optionally generates and provides the associated key pairs to the requester without disclosing these certificates and key pairs to the authorizing certificate authority. In another aspect, a distributed method is disclosed that allows individual nodes and/or units in a network to select certificates for broadcasting messages to a community of interest with a non-unique key.

37 Claims, 7 Drawing Sheets

(56) References Cited

U.S. PATENT DOCUMENTS

| | | | |
|---|---|---|---|
| 7,234,059 B1* | 6/2007 | Beaver et al. | 713/170 |
| 7,571,488 B2* | 8/2009 | Oho et al. | 726/27 |
| 7,600,114 B2* | 10/2009 | Reinold et al. | 713/156 |
| 7,734,050 B2* | 6/2010 | Tengler et al. | 380/270 |
| 7,840,813 B2* | 11/2010 | Canard et al. | 713/176 |
| 2001/0042050 A1 | 11/2001 | Fletcher et al. | |
| 2002/0154779 A1 | 10/2002 | Asano et al. | |
| 2003/0190046 A1* | 10/2003 | Kamerman et al. | 380/286 |
| 2003/0212892 A1* | 11/2003 | Oishi | 713/168 |
| 2005/0210254 A1 | 9/2005 | Gabryjelski et al. | |
| 2006/0174323 A1* | 8/2006 | Brown et al. | 726/3 |
| 2008/0235509 A1* | 9/2008 | Laberteaux et al. | 713/156 |

OTHER PUBLICATIONS

N. Zhang, Q. Shi, and M. Merabi, "Anonymous public-key certificates for anonymous and fair document exchange", IEE Proc. Communication., vol. 147, No. 6, Dec. 2000.*

International Search Report dated Jun. 30, 2008.

Eric Rescorla, et al. Analysis of Combinatoric Certificate Schemes, Industry Consortium DSRC, Aug. 7, 2006.

* cited by examiner

METHOD AND SYSTEM TO AUTHORIZE AND ASSIGN DIGITAL CERTIFICATES WITHOUT LOSS OF PRIVACY, AND/OR TO ENHANCE PRIVACY KEY SELECTION

CROSS-REFERENCE TO RELATED APPLICATIONS

This application claims the benefit of U.S. Provisional Application No. 60/899,073, filed on Feb. 2, 2007, and U.S. Provisional Application No. 60/918,741, filed on Mar. 19, 2007, which applications are incorporated herein by reference in their entirety.

FIELD OF THE INVENTION

The present disclosure relates generally to distributed privacy and security, and public key infrastructure (PKI) systems. The present disclosure also relates to PKI systems that serve anonymous users, which may be mobile or stationary.

BACKGROUND OF THE INVENTION

Public key infrastructure refers to an architecture based on asymmetric cryptography that permits computers to authenticate each other and engage in secure messaging. In asymmetric cryptography, a user has a pair of cryptographic keys, known as the public and private keys. The public key is shared and made available to others, while the private key is held secret. The keys are mathematically related to one another such that one key can be used to encrypt information and the other can be used to decrypt it. A well-known characteristic of asymmetric keys is that it is computationally impractical to derive the private key from knowledge of the public key. Information encrypted by one key can only be decrypted by its pair.

Asymmetric cryptography can be used to protect the confidentiality of information through public key encryption. It can also be used to authenticate the information source and attest to the integrity of the data through digital signatures. For instance, two users, A and B, can exchange information in a secure fashion. If user A wants to send information to user B, user A signs the information with its own private key and then encrypts it with user B's public key. Upon receipt of the message, user B decrypts the message using its private key and then validates the message signature with user A's public key. The information sent is kept confidential because it can only be decrypted by the private key that is singularly held by user B. Its integrity can be ascertained by using user A's public key to validate the signature. This is an example of an authenticate first and encrypt second model. It is also possible to encrypt first and authenticate second.

The above method requires user A to have knowledge of user B's public key and user B to have knowledge of user A's public key. In addition, user A needs to validate that the public key purported to be that of user B is indeed true, and vice versa. PKI provides architecture to satisfy this need. PKI binds public keys to entities, enables other entities to verify the public key bindings, and performs the services needed to manage the keys. In particular, PKI defines a system known as a certificate authority ("CA"). The certificate authority is a trusted third party that issues a digital certificate confirming that an entity holds a valid public-private key pair. The certificate authority also uses public key cryptography to sign each digital certificate so that a signed message recipient can establish a chain of trust from the sender to the trusted CA. In the case of validating a sender's signature, the recipient would first verify that the public key contained in the attached certificate is registered with the CA by means of validating the CA's signature of the certificate. The recipient would then use the public key to validate the signature and prove that the sender indeed holds the private key.

PKI has been considered as the digital certificate management system for vehicle communication networks. For example, PKI has been adopted for a new vehicle communication system known as the Vehicle Infrastructure Integration (VII) system. The VII system allows vehicles to communicate with one another and with intelligent roadside equipment, such as traffic signals, using short-range radio technologies such as the Dedicated Short Range Communications (DSRC) or other radio technologies. A goal of the VII system is to improve public safety on the nation's highways by providing the ability for highway controls to communicate with vehicles, such as to electronically report road conditions, and for vehicles to communicate with one another in support of advanced safety applications. One such application is collision avoidance where vehicles would monitor the position of other vehicles on the road and exchange communication with each other about their location and state. When there is the potential for collision, each vehicle would alert its occupant to the danger and potentially take preventive actions, such as braking the vehicle.

FIG. 1 illustrates components of a vehicle communication system such as the VII system. An IP-based VII backbone network (100) interconnects a multitude of radio equipped roadside equipment (RSE) (130) and application servers (110, 120). Each RSE (130) communicates (190) with vehicles (160, 170) within its radio zone (140) to deliver messages between the vehicles and the network devices and applications connected to the backbone network. Vehicles (160, 170) within an RSE zone (140) communicate (150) directly with one another. In addition, vehicles (170) within an RSE zone (140) may communicate (195) with vehicles (180) that are outside the RSE zone. More generally, vehicles need not be within any RSE coverage to communicate with one another.

A fundamental concern in vehicle communication networks such as in the VII system is the privacy of vehicle occupants and owners. Privacy become a concern when vehicles are mandated to participate in certain communications applications, such as providing probe data to a government run data center as currently envisioned in the VII system. Vehicle privacy is compromised of two elements: Anonymity and Unlinkability. Anonymity is the inability to identify or enable identification of a vehicle, its owner, or occupants because of its participation in a vehicle communication system. This includes, but is not limited to, message communications and information processed or retained within vehicle communication system. Identifying a vehicle means obtaining one or more distinguishable vehicle attributes that can be definitively linked to the vehicle, its owner and/or vehicle occupant. Unlinkability is the inability to definitively associate observations, data, or information, such as anonymous messages, with a particular, but possibly unidentified, vehicle, vehicle owner, or occupant as a result of participating in vehicle communication system. Unlinkability implies the inability to track a vehicle's path, especially as it moves from one radio zone to another.

To protect privacy of the vehicles and its occupants, vehicle messages need to be anonymous, i.e., they cannot be associated with any individual vehicle. However, to maintain the integrity of the system and to make sure that safety applications are not impacted by malicious communication, vehicle messages must be authenticated. Many vehicle communications, such as the VII system impose the dual requirement of anonymous, but authenticated communication. Others have proposed a method based on public key cryptography that provides for anonymity and message authentication. In this method, each vehicle is assigned n key pairs (and their associated certificates) from a system-wide pool of N key pairs by a certificate authority. The key pairs may be assigned such that there is an even distribution of keys among the vehicles. Since the number of vehicles in the system is much greater than N, there is substantial reuse of key pairs, i.e., more than one vehicle uses the same key. Using this method, any one of a number of vehicles might be able to generate and sign or encrypt a message with a particular key, hence providing a level of privacy to each individual vehicle. However, each message can be authenticated by verifying the registration of the key with the CA and validating the message signature.

It is a goal of the VII system to maintain vehicle anonymity throughout the entire system following a "privacy by design" approach. In particular, the certificate authority is an entity that has the potential to contain much information about the keys that are assigned to vehicles. Several abuses of the certificate authority could compromise vehicle privacy and negatively impact commercial entities that participate in the VII system. For instance, it might be possible for the certificate authority to assign one or more unique keys to a vehicle so that it can be unequivocally identified whenever it communicates. Other than the vehicle, the certificate authority is the only other entity that has knowledge of the keys and certificates that were assigned to each vehicle. Using parameters such as n=5 and N=10,000, the probability that a vehicle has any particular set of n evenly distributed keys is extremely small and is given by the inverse of the number of combinations of 5 keys taken from 10,000 (i.e., "10,000 choose 5") or approximately 1.2e-18. The set of n keys therefore provides a unique identifier for each vehicle and could potentially be used to track a vehicle. In addition, insider threats within the VII system operator and the potential for outside forces to influence a system operator to take advantage of the certificate authority to violate vehicle privacy may exist.

The foregoing discussion highlights the need for a method and system to construct a certificate authority that minimizes the potential for any one party associated with the certificate authority to abuse its position to violate vehicle privacy. In particular, a certificate management system and method is sought that will not provide any element of the certificate management infrastructure with the ability to link individual certificates, which contain no identifying information, with certificate holders.

In another aspect, the present disclosure addresses a large scale network with certified communications, where each node has a limited number of certificates, and where the use of a certain certificate may inadvertently identify which node sent the message. This is, for instance, the case when the pool of available certificates is large, and the number of nodes communicating is small, and the nodes randomly or indiscriminately select from among their available certificates to send messages. In contrast, it is often not desirable to first explicitly communicate available keys in the community of interest. While known distributed consensus algorithms may be able to achieve the goal of communication with non-unique keys, those algorithms require additional communication overhead. Therefore, typically a large communication overhead is involved. Different areas of application may not allow for any communication overhead related to key selection at all. Furthermore, key selection protocols based on explicit mutual communication may not be desirable in many areas of application. Thus, what is desirable is to have individual nodes select a certificate (also referred to as a "key"), which is used by more than one node, so that each node using that key cannot be identified by use of the key alone. It is further desirable to do so without additional communication overhead for key selection.

BRIEF SUMMARY OF THE INVENTION

A method and system for managing digital certificates in a public key infrastructure are provided. The method, in one aspect, may comprise separating the certificate authorization and assignment functions in a public key infrastructure system between one or more authorizing certificate authorities and one or more assigning certificate authorities that are managed in independent and separate security domains. The method may further include registering certificate applicant identifying information in an authorizing certificate authority, receiving certificate requests at an assigning certificate authority, routing authentication requests from the assigning certificate authority to an authorizing certificate authority, authorizing certificate requests at the authorizing certificate authority, allowing the certificate applicant to anonymously pass its identity to the authorizing certificate authority through the assigning certificate authority, and issuing one or more certificates from the assigning certificate authority to a certificate applicant who remains anonymous to the assigning certificate authority.

In another aspect, a method of assigning certificates may be provided. The method may comprise, receiving a certificate request from a certificate applicant at an assigning certificate authority. The method may further comprise receiving an applicant identifying information with said certificate request. The applicant identifying information is in a form that remains anonymous to said assigning certificate authority. The method may also comprise sending an authorization request to an authorizing certificate authority with said certificate identifying information, receiving an authorization from said authorizing certificate authority. The method may further comprise issuing a certificate to said certificate applicant in response to receiving the authorization. The certificate is anonymous to said authorizing certificate authority.

Yet in another aspect, a method is provided for authorizing certificate requests. The method may comprise registering a plurality of certificate applicant identifying information and receiving an authorization request from an assigning certificate authority. The authorization request includes identifying information associated with a certificate applicant and the identifying information is anonymous to said assigning certificate authority. The method may also comprise determining if said identifying information received from said assigning certificate authority matches one or more of the registered certificate applicant identifying information, and authorizing said request from the assigning certificate authority based on the determining step.

Still yet in another aspect, a method of selecting a key used to protect messages being sent to increase privacy is provided. The method may comprise determining whether there are keys marked as being used from a plurality of keys a sending node possesses, before sending a message at a sending node and if one or more marked keys exist, selecting a key that is marked as being used, from said one or more marked keys before sending a message at a sending node. The method may also comprise, if no marked key exists, selecting a key from the plurality of keys, before sending said message at the sending node. The method may further comprise determining at a receiving node after receiving said message, whether the receiving node has a key that is the same or equivalent to said selected key, which is protecting said message. The method may also comprise, if the receiving node has said key, verifying that said key is marked and if said key is not marked, marking said key as being used.

A system for managing digital certificates in a public key infrastructure, in one aspect, may comprise, one or more assigning certificate authorities operable to create, manage, and assign a plurality of certificates to one or more certificate applicants that are anonymous to said one or more assigning certificate authorities. One or more authorizing certificate authorities are separated functionally from said one or more assigning certificate authorities, and is operable to register certificate applicant identifying information. Said one or more authorizing certificate authorities are further operable to receive requests for authorizing certificates from said one or more assigning certificate authorities. The certificates remaining anonymous to said one or more authorizing certificate authorities.

Program storage device readable by machine, tangibly embodying a program of instructions executable by the machine to perform above methods may be also provided.

Further features as well as the structure and operation of various embodiments are described in detail below with reference to the accompanying drawings. In the drawings, like reference numbers indicate identical or functionally similar elements.

DETAILED DESCRIPTION

An aspect of the present disclosure describes public key infrastructure key and certificate management that provide privacy, in terms of anonymity and untraceability for example, to certificate holders and protect the privacy of certificate holders from the compromise of a certificate authority. A monolithic certificate authority is decomposed into a system of two or more distributed certificate authorities, such that there is functional separation in the authorization of a certificate request and the assignment of certificates and key pairs. The authorizing certificate authority approves or denies each certificate request from a requester whose identity is not made available to the assigning certificate authority. The assigning certificate authority, upon approval from the authorizing certificate authority, issues one or more certificates and optionally generates and provides the associated key pairs to the requester without disclosing these certificates and key pairs to the authorizing certificate authority. Neither the authorizing nor the assigning certificate authority alone has sufficient information to associate a certificate with a particular certificate holder entity. Intrusion detection capabilities can be provided at one or both of the authorizing and assigning certificate authorities while maintaining certificate holder anonymity at the assigning certificate authority.

The following description presents system and method of the present disclosure, using its application to the VII system. It should be understood, however, that the application of the system and method of the present disclosure is not limited only to the VII system. Rather, any other systems or methods desiring protection of security and privacy may utilize the method and system of the present disclosure.

Figure 1:
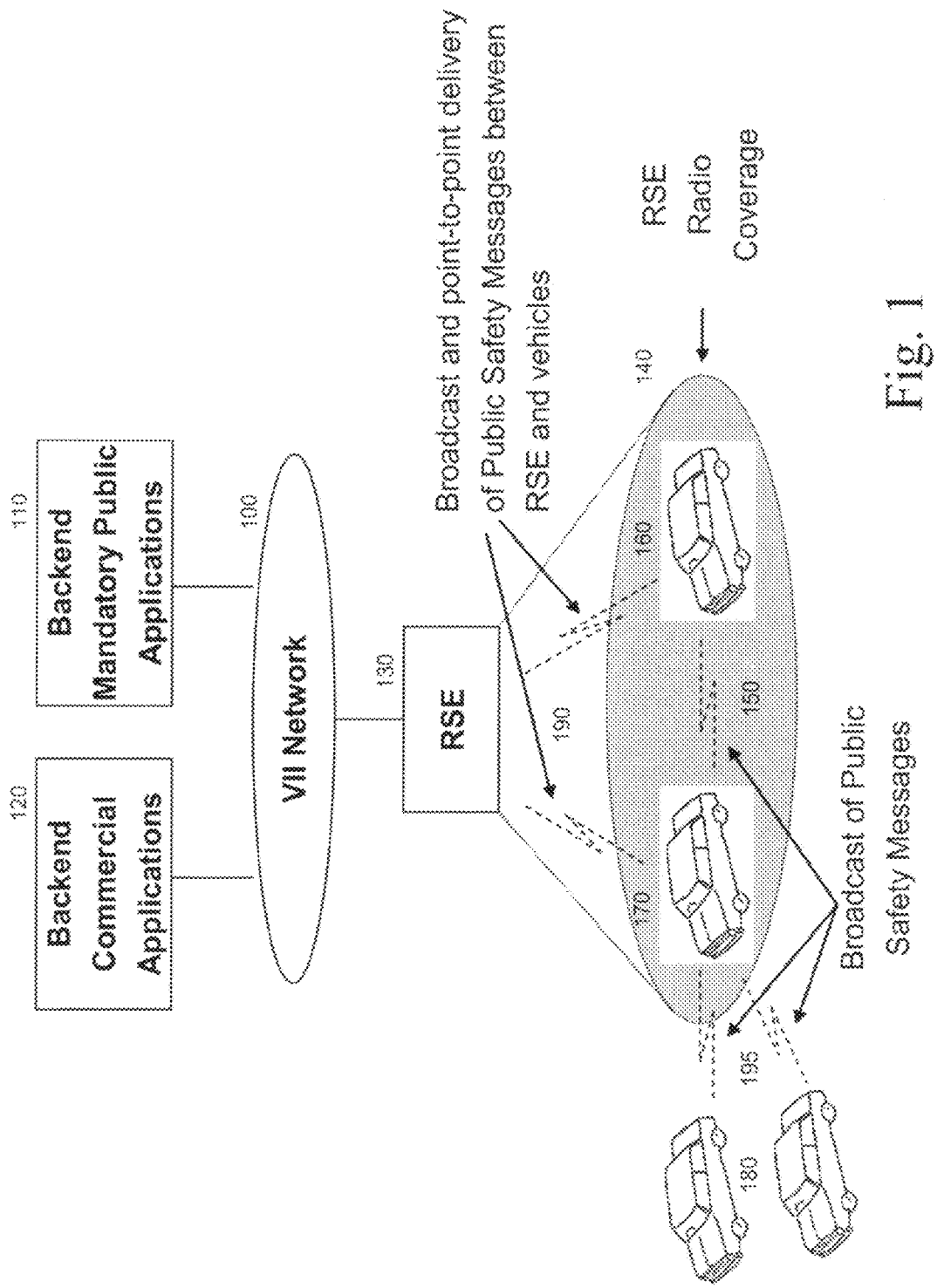
FIG. 1 illustrates a Vehicle Infrastructure Integration System.
Figure 2:
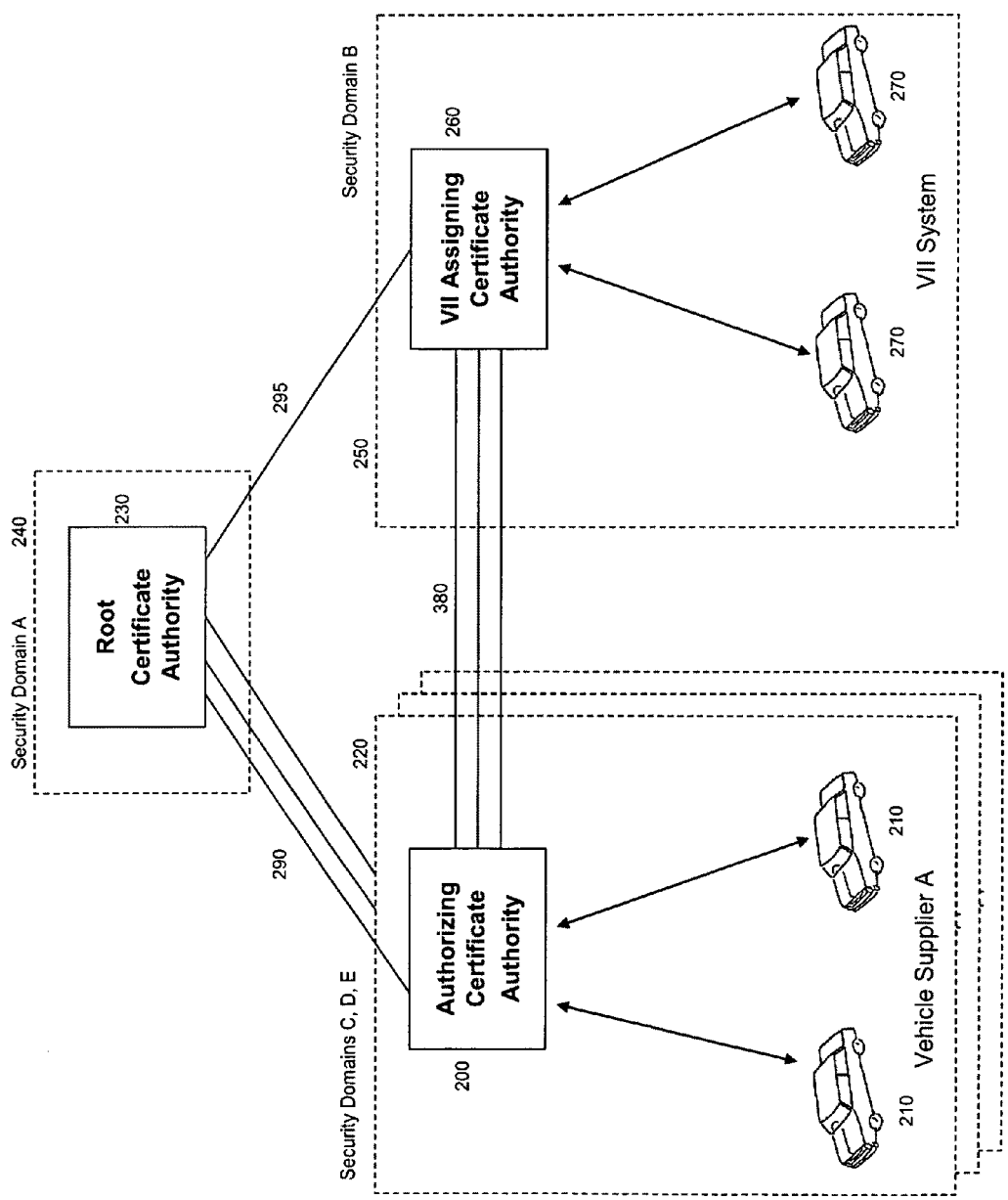
FIG. 2 illustrates authorizing and assigning certificate authority architecture in one embodiment of the present disclosure.

FIG. 2 illustrates distributed certificate authority architecture in one embodiment. Functions associated with traditional, monolithic certificate authorities are decomposed into one or more authorizing (200) and assigning (260) certificate authorities, each operating under independent and separate security domains and preferably administered by different operators. In the example of the VII system, each authorizing certificate authority (200) is preferably operated by a vehicle supplier. The assigning certificate authority (260) is shown in FIG. 2 as part of the VII system and may be operated by the operator of the VII system or by an agent of the government. Trust relationships may be established among the certificate authorities through a root certificate authority (240) or other means available.

A role of the assigning certificate authority (260) is to create, manage, and assign a pool shared among many or all vehicles. The assigning certificate authority assigns anonymous certificates to vehicles in a manner that maintains an even distribution, or other desirable distributions, of certificates among vehicles, maintains the certificate revocation list, and replenishes the pool of N certificates when one or more certificates are revoked.

A role of the authorizing certificate authorities (200) is to approve or deny requests for anonymous certificates. Separating the functions of authorization and assignment creates architecture whereby the authorizing entity, which maintains identifying information about each vehicle, does not have knowledge of the anonymous certificates that each vehicle is using. Similarly, the assigning certificate authority, while having knowledge of the anonymous certificate assignments does not have knowledge of the vehicle identities.

Figure 3:
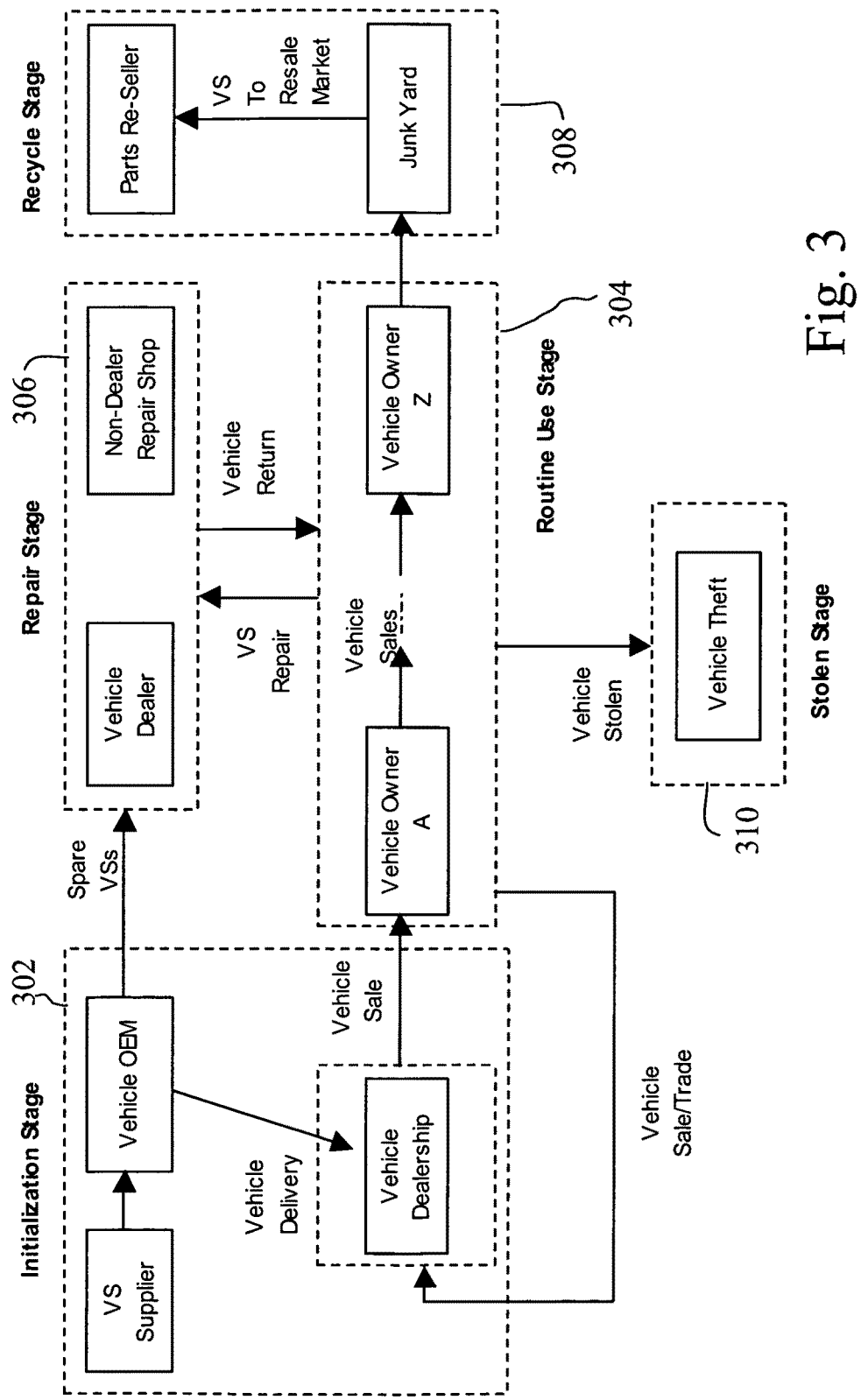
FIG. 3 illustrates a lifecycle of a vehicle certificate holder in one embodiment of the present disclosure.

A novelty of the certificate authority architecture shown in FIG. 2 may be illustrated by examining the phases in the lifecycle of a certificate holder, i.e., a vehicle. The distributed certificate authority supports the following phases in the lifetime of a certificate holder in one embodiment: Initialization 302, Routine Use 304, Repair 306, Recycling 308, and Theft 310. FIG. 3 illustrates these stages in the context of a vehicle in one embodiment.

Figure 4:
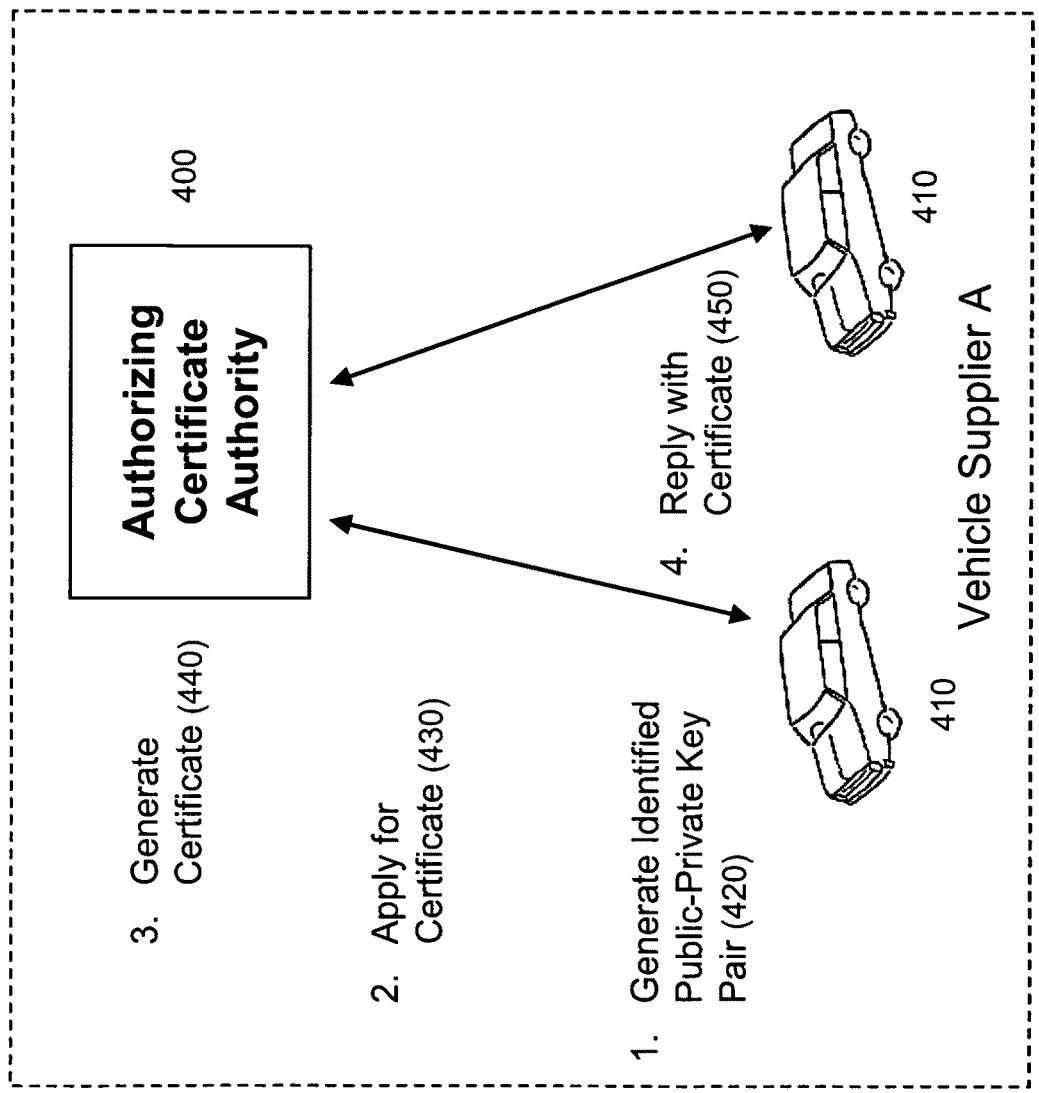
FIG. 4 illustrates a process of a vehicle applicant registering with an authorizing certificate authority in one embodiment of the present disclosure.

In the Initialization or registration phase, the authorizing certificate authority and vehicle decide upon an identity by which the authorizing certificate authority knows the vehicle and a method to authenticate the identity. They may also share a secret. In one preferred embodiment, the authorizing certificate authority issues a PKI certificate to the vehicle through a process illustrated in FIG. 4. During the initialization phase, communications is established between the authorizing certificate authority and the vehicle. It can be initiated by either participant and preferably occurs during vehicle assembly, although the initialization phase may occur at other times as long as the authenticity and integrity of the vehicle is known to the authorizing certificate authority. To acquire a certificate, the vehicle (410) preferably generates a public-private key pair (420). It applies for an identifying certificate (430) with the authorizing certificate authority (400) by sending it public key and a message that is signed with its private key. The private key corresponding to the identifying certificate is never released by the vehicle, not even to the authorizing certificate authority. Only the vehicle knows its private key. This method is advantageous over an alternate approach where the authorizing certificate authority generates the public-private key pair and then providing the key pair to the vehicle. Upon receiving the request, the authorizing certificate authority (400) validates the message signature using the public key and thereby confirms that the vehicle is the holder of the private key. The authorizing certificate authority then generates an identifying certificate (440) and internally associates it with other information that it knows about the vehicle. Some of this information might be in the form of unique identifiers, such as a vehicle identification number. It may also have information about the vehicle construction and possibly its owner. The authorizing certificate authority then sends the identifying certificate (450), which may also contain the authorizing certificate authority's public key, to the vehicle (410). The vehicle (410) is now uniquely known to the authorizing certificate authority.

Figure 5:
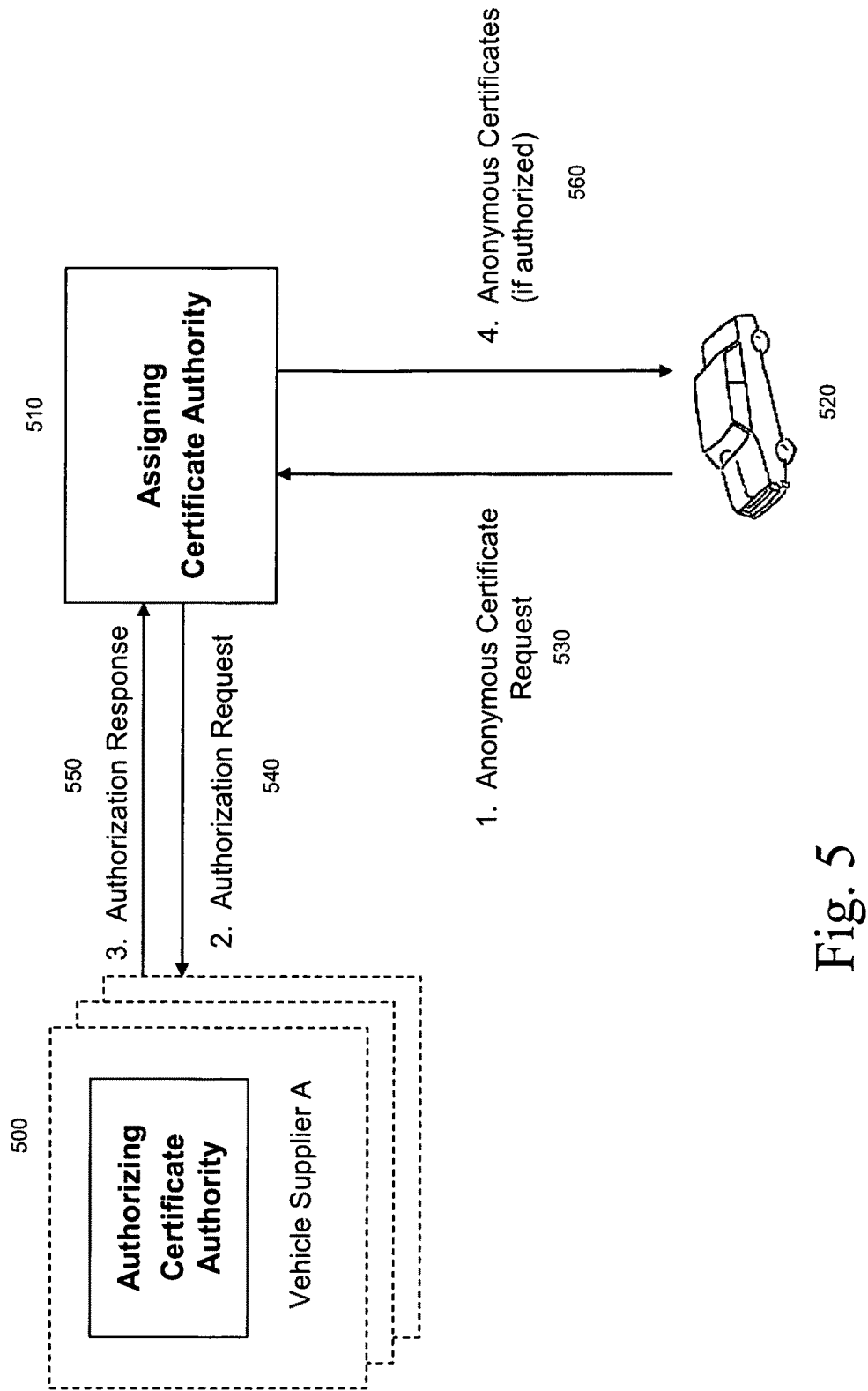
FIG. 5 illustrates a process of a vehicle applicant requesting anonymous certificates from an assigning certificate authority in one embodiment of the present disclosure.

After the vehicle has identified itself to the authorizing certificate authority, it needs to acquire certificates that it will use to sign messages. It acquires these certificates, which are preferably anonymous, from the assigning certificate authority. As illustrated in FIG. 5, a vehicle (520) makes a request for certificates (530) to the assigning certificate authority (510). The request may contain, for example, among other information, information associated with the vehicle, which remains anonymous to the assigning certificate authority (510), and which the assigning certificate authority (510) passes on to the authorizing certificate authority (500) for the authorizing certificate authority (500) to be able to identify the vehicle for keying and/or re-keying. This information may be encrypted identity of the vehicle. In one embodiment of keying and/or re-keying, the vehicle can use the public key of the authorizing certificate authority (500) to which it previously registered along with asymmetric encryption algorithms commonly known to those skilled in the art to encrypt its identity. The object is to provide unique identifying information in a form that the assigning certificate authority cannot decode and/or decrypt. The identity also may include a time-varying element, such as a timestamp, such that the cipher text does not become a fixed pseudonym for the vehicle. An alternate embodiment of the invention uses a pre-shared key between the authorizing certificate authority and the vehicle, which was installed in the vehicle by the authorizing certificate authority during registration. In this case, more efficient symmetric encryption algorithms can be used. In one preferred embodiment, the vehicle identity could be its identifying certificate and/or its vehicle identification number.

Upon receiving the certificate request (530), the assigning certificate authority (510) launches an authorization request (540) to the authorizing certificate authority (500). In a system with multiple authorizing certificate authorities (500), the assigning certificate authority first needs to determine to which authorizing certificate authority (500) it should send the authorization request (540). In one preferred embodiment, the vehicle (520) can include the identity of the authorizing certificate authority (500) in its certificate request. The identity of the authorizing certificate authority (500) provides minimal information about the identity of the vehicle (520) to the assigning certificate authority (510) because numerous vehicles are registered with each of the authorizing certificate authorities (500). For instance, an authorizing certificate authority (500) may be used for an individual automobile manufacturer. In another embodiment of the present disclosure, the vehicle can provide group information, such as its automobile maker. The assigning certificate authority (510) can analyze the group information to route its authorization request to the proper authorizing certificate authority (500). The vehicle (500) should not send any uniquely identifying information, such as the identifying certificate provided by the authorizing certificate authority (500) at registration, to the assigning certificate authority (510) to maintain its anonymity to the assigning certificate authority (510).

The authorization request (540) contains the encrypted identity of the vehicle, a transaction identifier, and possibly information about the type of certificate or service that has been requested. The transaction identifier is assigned by the assigning certificate authority (510) so that multiple authorization requests (540) can be launched in parallel and the authorization responses (550) can be mapped to each request. The authorizing certificate authority (500) decrypts the identity and performs one or more authorization checks to determine if the request should be authorized. If the request is authorized, the authorizing certificate authority (500) sends a positive authorization response (550) to the assigning certificate authority (510), which, in turn, selects and sends anonymous certificates (560) to the vehicle (520). Otherwise, the request is denied and no certificates are provided to the vehicle (520)

Figure 6:
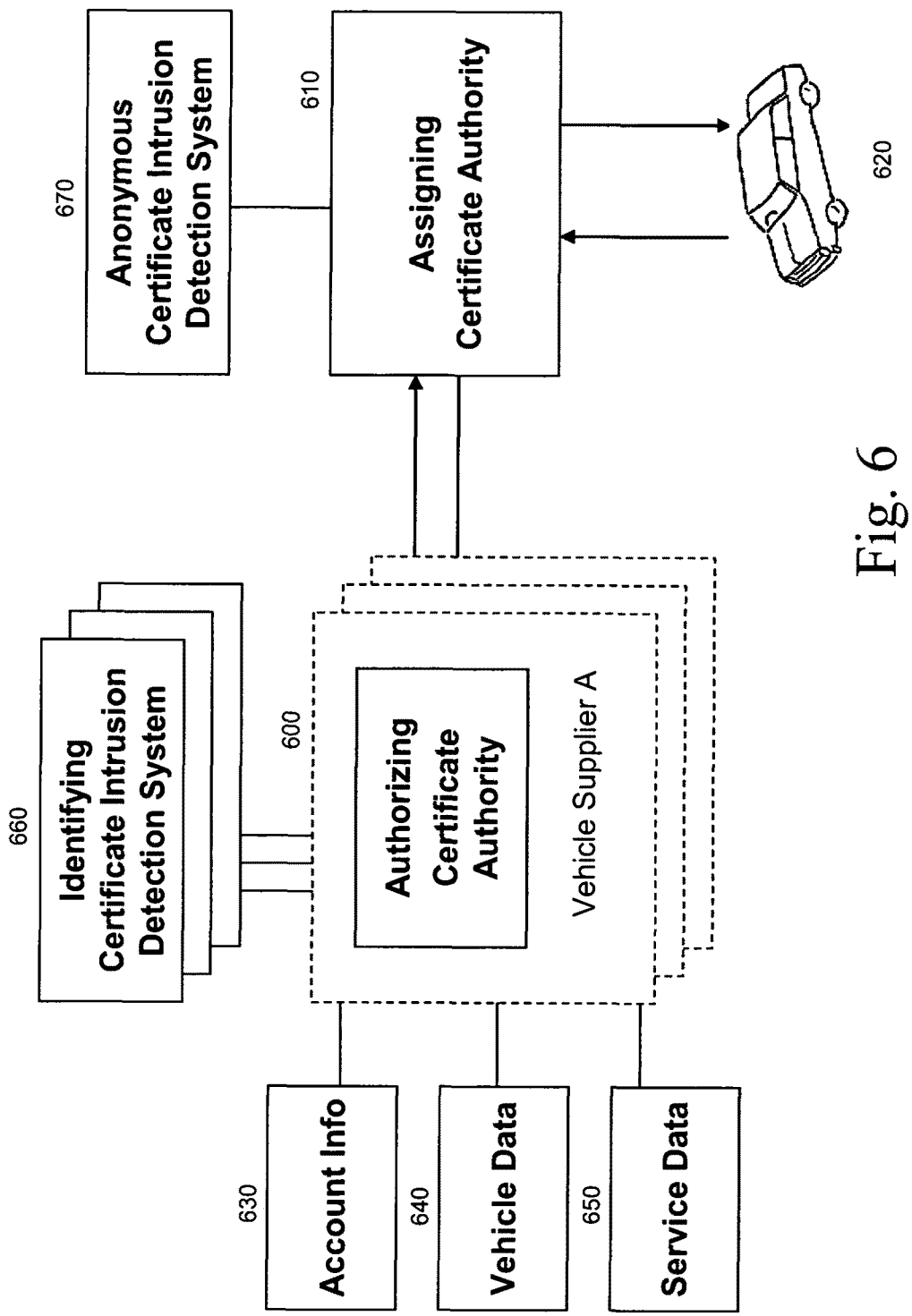
FIG. 6 illustrates certificate authority architecture with intrusion detection and back-end data functions in one embodiment of the present disclosure.

The authorization checks may include a variety of criteria, such as vehicle status, account status, and intrusion status. Back-end systems (630, 640, 650, and 660) that support the authorization checks are shown in FIG. 6. The vehicle status check may determine if the vehicle has been reported stolen. If the vehicle has been reported stolen or salvaged, authorization would be denied. The vehicle status check may also validate that the vehicle has the proper equipment to support the requested certificate or service. For instance, a request made by a malicious user for a certificate associated with a navigation service would be denied if the authorizing certificate authority determines that the vehicle cannot support the service.

An account status check might be used to determine if the vehicle owner is in arrears on payment or whether the account is in good standing. The account status check may also determine whether the vehicle has subscribed to a particular service and should be provided a particular certificate.

An intrusion check is a set of criteria that helps determine whether the vehicle has been compromised by an attacker who is trying to exploit the system. In one embodiment of the present disclosure, the authorizing certificate authority (600) has an intrusion detection system (660) that implements a re-keying counter to track the number of times a vehicle (620) has been re-keyed, the dates on which the re-keying occurred, and the vehicle location during each re-keying, if available. In another embodiment of the present disclosure, the intrusion check might deny authorization if the vehicle is of a make and model that is known to have been compromised.

In yet another embodiment of the present disclosure, the assigning certificate authority (610) might have an intrusion detection system (670) that tracks the misuse of anonymous certificates. When a vehicle (620) makes a request for certificates, the assigning certificate authority may compare the certificates already in the possession of the vehicle (620) against the certificates suspected of being compromised or certificates that have been officially revoked to formulate a rating about whether the vehicle (620) is likely to have been a source of certificate abuse. For instance, in a known random certificate management method where each vehicle has n distinct certificates drawn uniformly at random from a certificate-pool of size N, a vehicle with all n certificates on the revocation list is statistically likely to be a malefactor. The assigning certificate authority (610) may pass this rating in the authorization request (540) so that the authorizing certificate authority (600) can make an assessment that advantageously correlates other sources of information to help make a determination about whether the vehicle is a malefactor. If the authorizing certificate authority (600) denies the request because it has classified the vehicle (620) as a malefactor, it may report the vehicle to a state vehicle inspection agency or dealership for interrogation during the next schedule visit. Depending upon the circumstances, the authorization certificate authority (600) may also report the vehicle to the law enforcement.

In a variant of the last embodiment, the anonymous certificate intrusion detection system (670) might take advantage of a characteristic of the combinatorial method whereby the set of n certificates is a rather unique identifier. The anonymous certificate intrusion detection system (670) may assign a re-keying counter to each set of anonymous certificates that the assigning certificate authority (610) issues. When a vehicle (620) requests a new certificate, the assigning certificate authority may request the list of certificates already in possession of the vehicle (620) and increment the re-keying counter associated with the vehicle's set of certificates. If the vehicle was granted authorization for a new certificate or set of certificates, the assigning certificate authority (510) would update the set of certificates associated with the re-keying counter so that the next vehicle re-keying attempt could be properly tallied. If the re-keying instances exceed a threshold, the assigning certificate authority could report the occurrence to the authorizing certificate authority, which might deny the certificate request based on this information and possibly the correlation of it with other sources that might indicate the vehicle is a malefactor. Alternatively, the assigning certificate authority may immediately deny the request and inform the authorizing certificate authority (600).

Unlike the anonymous certificate intrusion detection system (670) for the assigning certificate authority (610), the intrusion detection system (660) for the authorizing certificate authority (600) monitors identified certificates, i.e., certificates that are unique to each vehicle, and may have the benefit of each vehicle's identity. This separation advantageously allows the assignment and intrusion monitoring of anonymous certificates by an entity other than the operator of the authorizing certificate authority, without sacrificing vehicle anonymity.

During the Routine Use phase 304 in FIG. 3, the assigning certificate authority (610) makes available a list of revoked certificates using the certificate revocation list (CRL) that is well known to those skilled in the art of PKI. A certificate may be added to the CRL based on information from the assigning certificate authority intrusion detection system (670). The authorizing certificate authority in combination with its intrusion detection system may also indicate to the assigning certificate authority that the certificates known to the assigning certificate authority for the vehicle known to the authorizing certificate authority should be added to the CRL. The assigning certificate authority may also identify certificates to add to the CRL based on re-keying rejections by the authorizing certificate authority. Vehicles with one or more certificates on the CRL need to re-key using a process that is essentially the same of that described for the anonymous certificate initialization phase.

During the Theft 310 and Recycling phases 308 in FIG. 3, the identities of stolen or junked vehicles, such as a vehicle identification number or other unique vehicle attribute, may be reported to the authorizing certificate authority and marked in the Vehicle Data store (640). If the authorizing certificate authority (600) then receives an authorization request from a vehicle that has been marked stolen or salvaged, the authorizing certificate authority will deny it. Alternatively, the authorizing certificate authority might approve the request and indicate to the assigning certificate authority to assign a special certificate that can be tracked in the system for vehicle recovery.

In the Repair phase 306 in FIG. 3, vehicle equipment may need to be inspected for tampering and potentially replaced if it is malfunctioning. If evidence of tampering is detected, the authorizing certificate authority Vehicle Data store (640) is updated to show that the vehicle has been compromised, thus creating reason to deny all future authorization requests for this vehicle. If the vehicle equipment needs to be replaced by an authorized repair facility, the Vehicle Data store (640) is updated to indicate that the vehicle has been reset. Information associated with the previous vehicle identifying certificate, such as the re-keying counter, is re-initialized. The vehicle then enters the Initialization/Registration phase 302 and proceeds to register with the authorizing certificate authority (600) and request anonymous certificates form the assigning certificate authority (610).

While the foregoing discussion references anonymous certificates and a combinatorial assignment method, this invention can equally be applied to other assignment methods, including those where certificates are unique to each certificate holder. For example, the assigning certificate authority can issue a unique certificate to a vehicle that remains anonymous to it because the vehicle only reveals its identity to the authorizing certificate authority. In all cases, it is preferable that the certificates issued by the assigning certificate authority contain no information normally found in traditional PKI certificates, e.g., X.509 certificates that disclose the identity of the certificate holder.

A method and system were described in which the certificate assigner does not have any identifying information about the certificate requester. It issues certificates to an anonymous certificate requester after obtaining approval from the authorizing certificate authority. A method and system also described in one embodiment how a certificate requester can electronically request certificates through the certificate assigner without revealing its identity to the certificate assigner. Neither the authorizing certificate authority nor the certificate assigner individually has sufficient information to associate a certificate with the identity of a particular entity, applicant, or requester. The certificates do not contain information that identifies the certificate holder. The authorizing certificate authority authenticates the holder as a legitimate system user. While the method and system for described with reference to vehicle examples, it should be understood that the method and system may be applicable to any other authorization and assignment systems and methodology.

In another aspect of the present disclosure, a distributed method is presented for individual nodes in a network (for example, vehicles) to select certificates for broadcasting messages to a community of interest with a non-unique key (certificate), in which the individual node has at least one non-unique key in the community of interest. In one embodiment, the method does not require each node to have global knowledge of all keys owned by the other nodes. Yet in another embodiment, the method does not need communication overhead.

A key (certificate) selection method disclosed herein, for instance, may be of use in conjunction with a randomized key management scheme, where v units (e.g., vehicles) in a community of interest or geographical area each have n distinct keys drawn uniformly at random from a key-pool of size N. Keys may be replicated among units. The privacy level experienced by an unit is related to the ease with which an observer can identify a unit as having transmitted a particular message or as being in a particular location at a particular time. Since the community and/or area contain a limited number of units, the chance that an observer's target unit has a unique certificate within the observation area is a measure of the target unit's privacy. Let R(N, n, v) be the probability that a unit has a unique certificate in a community and/or area with v other units, then $$R(N, n, v) = 1 - \left(1 - \left(1 - \frac{n}{N}\right)^v\right)^n.$$

Clearly the more units that are in the observation area the lower the chance of the target unit having a unique certificate. This chance of a unit having a unique certificate is lower with lower pool size N. Higher n increases privacy by reducing the probability of a unit having a unique certificate in a community and/or area. For moderate community size v, the chance that any given unit A has a unique key is very high. On the other hand, there is quite possibly at least one other unit B in the community that has at least one key in common with the given unit A.

Having a certificate (key) in common with other units in the community and/or area provides the potential of increased privacy for a given unit: if two units send messages using identical keys and certificates, then their identity is not revealed to the system by their key alone. If the units simply use random keys for their messages, it is possible, even likely, that they will not use a common key, even though they share at least one key. An algorithm is described for key selection that one or more units can run in a distributed manner, in order to select a common key when it is available.

Figure 7:
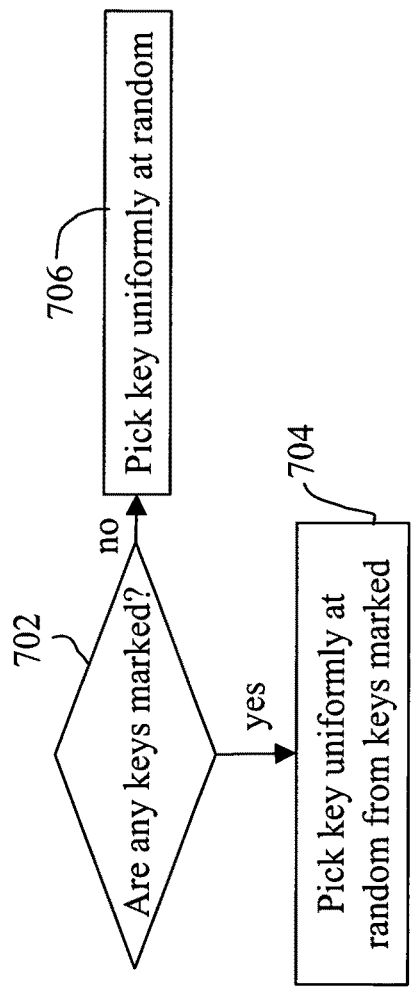
FIG. 7 illustrates a key selection method before sending a message in one embodiment of the present disclosure.
Figure 8:
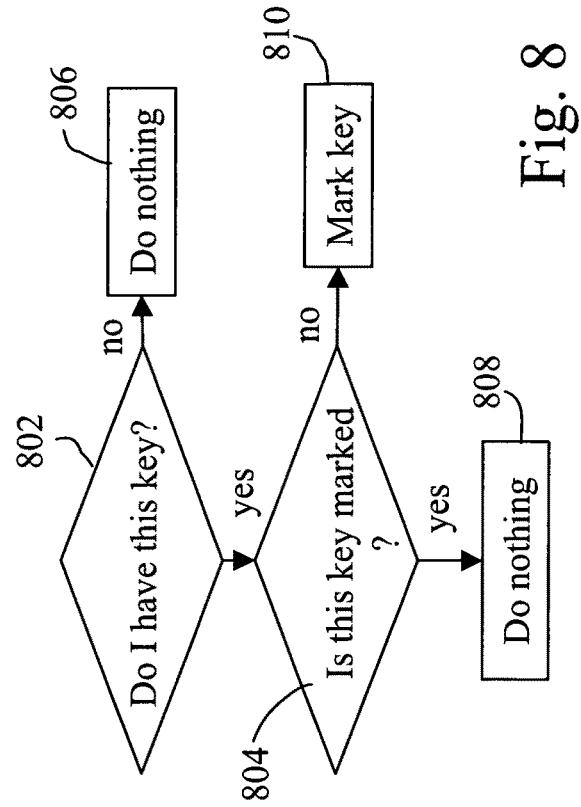
FIG. 8 illustrates a privacy preserving key selection method upon receiving a message in one embodiment of the present disclosure.

In one embodiment, a privacy preserving key selection method has two parts, shown in FIG. 7 and FIG. 8, respectively. Before sending a message, each node executes the algorithm described in FIG. 7. At 702, a node verifies if any of its keys (certificates) are currently marked, for instance, marked as 1. A key is marked when, for example, a message received from another node is signed using the key indicating that the key is shared by another node. If one or more keys are marked, then at 704, the node picks a certificate uniformly at random from among all keys that are marked 1. If no keys are marked 1, then at 706, the node picks a certificate uniformly at random from among all its available certificates or key-pool. In another embodiment, the keys to be used may be selected according to other desirable statistical distributions. Each marked key may also have an associated timer to indicate how long the key should remain as a marked key. Each marked key may also have an age indicating how long the key has been in the marked state. The ages of the keys may be used as input parameters to the key selection algorithms. For example, the selection algorithm may select keys with shorter ages with higher probabilities than keys with longer ages.

After receiving a message, each node executes the algorithm described in FIG. 8. At 802, a node verifies if it has the key of the message, which was received. If the node has the key, at 804, the node verifies if that key is currently marked 1. If the node does not have the key, it does nothing as shown at 806. If the node has the key, and it is marked 1, then at 808, it does nothing. If the node has the key, but it is not marked 1, the node marks the key 1 at 810.

The method in one embodiment does not involve any explicit interchange of keys for comparison, which may be one way to broadcast messages with a non-unique key. The method in one embodiment also does not require global knowledge of keys available in the community of interest, which may be another way to broadcast messages with a non-unique key. Furthermore, the method in one embodiment does not select solely the first non-unique key it possesses and receives in a message. The key selection method in one embodiment of the present disclosure achieves the following goals for each node in a community of interest V. In the proof of the hypothesis, it is assumed that each node keeps sending and receiving messages indefinitely.

Hypothesis 1: Let i be an arbitrary node in V. If node i in community of interest V does not have only unique keys among the nodes in community of interest V, then eventually, node i will use only keys which it has in common with some other node in V.

Proof: Suppose node i has at least one key in common with other nodes in V. From the assumption that nodes keep sending and receiving messages indefinitely, node i will 1) use this key in a message it sends by step 706, or 2) receive a message with this key by step 704. In case it uses the key in sending a message, there is some other node j in V, which also has this key. By step 810, node j will mark this key 1 (if it has not already done so). By step 704, node j will eventually send out a message with key. Upon receiving this message, by step 810, node i will mark this key (if it has not already done so). Now node i and node j each have at least one key marked 1. Therefore, by step 704 they will only use keys, which they have in common with other nodes in V. The hypothesis is proven.

Hypothesis 2: Suppose each node in V has a key in common with some other node in V. Then eventually, all keys in use among the nodes in V are used by more than one node in V.

Proof: The proof of this hypothesis is similar to the proof above. Pick an arbitrary node i in V. Suppose node i has at least one key in common with other nodes in V. From the assumption that nodes keep sending and receiving messages indefinitely, node i will 1) use this key in a message it sends by step 706, or 2) receive a message with this key by step 704. In case it uses the key in sending a message, there is some other node j in V, which also has this key. By step 810, node j will mark this key 1 (if it has not already done so). By step 704, node j will eventually send out a message with key. Upon receiving this message, by step 810, node i will mark this key (if it hasn't already done so). Now node i and node j each have at least one key marked 1. Therefore, by step 704, they will only use keys, which they have in common with other nodes in V. In other words, eventually all keys in use among the nodes in V are used by more than one node in V. The hypothesis is proven.

The method described above does not require global knowledge of the keys available among all nodes in the community of interest, and it does not incur any communication overhead in the key selection algorithm. On the other hand, a typical distributed consensus method, where the 'consensus' is on the total available set of keys in the community, would require explicit signaling among nodes to exchange keys until each node has knowledge of all the keys in the community of interest.

Various aspects of the present disclosure may be embodied as a program, software, or computer instructions embodied in a computer or machine usable or readable medium, which causes the computer or Machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for managing digital certificates in a public key infrastructure comprising the steps of:
    separating the certificate authorization and assignment functions in a public key infrastructure system between one or more authorizing certificate authorities implemented as one or more computer systems and one or more assigning certificate authorities implemented as one or more computer systems that are managed in independent and separate security domains;
    registering certificate applicant identifying information in an authorizing certificate authority;
    receiving certificate requests from a certificate applicant only at an assigning certificate authority;
    routing authentication requests from the assigning certificate authority to an authorizing certificate authority;
    authorizing certificate requests at the authorizing certificate authority;
    allowing the certificate applicant to anonymously pass its identity to the authorizing certificate authority through the assigning certificate authority without the certificate applicant communicating the certificate request to the authorizing certificate authority; and
    issuing one or more certificates from the assigning certificate authority to certificate applicant who remains anonymous to the assigning certificate authority.

2. The method of claim 1, wherein said step of receiving certificate requests at an assigning certificate authority further includes receiving unique identifying information associated with the certificate applicant in a foiin that remains anonymous to the assigning certificate authority.

3. The method of claim 1, wherein said step of registering certificate applicant identifying information comprises:
    receiving a public key of a public-private key pair generated by the certificate applicant and a message signed with a private key of the public-private key pair at the authorizing certificate authority;
    validating signature of the message using the public key to confirm that the certificate applicant is a holder of the private key at the authorizing certificate authority;
    generating an identifying certificate at the authorizing certificate authority;
    associating the identifying certificate with the certificate applicant at the authorizing certificate authority; and
    sending the identifying certificate to the certificate applicant from the authorizing certificate authority.

4. The method of claim 3, wherein said step of sending the identifying certificate further includes sending an authorizing certificate authority's public key to the certificate applicant.

5. The method of claim 3, wherein the identifying certificate includes an identity of the certificate applicant.

6. The method of claim 3, wherein the identifying certificate includes a vehicle identification number associated with the certificate applicant.

7. The method of claim 1, wherein the step of allowing the certificate applicant to anonymously pass its identity to the authorizing certificate authority through the assigning certificate authority comprises:
    receiving an encrypted identity of the certificate applicant with the certificate request at the assigning certificate authority and the assigning certificate authority sending the encrypted identity with the authentication request in the routing step.

8. The method of claim 7, wherein the encrypted identity was encrypted by the certificate applicant using authorizing certificate authority's public key.

9. The method of claim 1, wherein the step of routing authentication requests further comprises routing an authentication request with certificate applicant identifying information that is anonymous to the assigning certificate authority, but identifiable by the authorizing certificate authority; and
    the step of authorizing certificate requests includes approving the authentication request after authorizing certificate authority performs one or more authorization checks using the certificate applicant identifying information.

10. The method of claim 9, wherein said one or more authorization checks includes certificate applicant status, account status, or intrusion status, or combinations thereof.

11. The method of claim 1, further including:
    providing intrusion detection capabilities at said one or more authorizing certificate authorities and said one or more assigning certificate authorities.

12. The method of claim 11, wherein the step of providing intrusion detection capabilities at said one or more authorizing certificate authorities includes:
    implementing a re-keying counter to track occurrences of re-keying, checking if certificate applicant's identity is associated with theft, or combinations thereof.

13. The method of claim 11, wherein the step of providing intrusion detection capability at said one or more authorizing certificate authorities includes:
    determining that certificate applicant's identity is associated with theft; and authorizing the assigning certificate authority to issue a special certificate that can be tracked.

14. The method of claim 11, wherein the step of providing intrusion detection capabilities at said one or more assigning certificate authorities includes:
tracking misuse of the certificates.

15. The method of claim 11, wherein the step of providing intrusion detection capability at said one or more assigning certificate authorities includes:
comparing one or more certificates that are in possession of the certificate applicant against one or more certificates suspected of being compromised or revoked or both; and
rating whether the certificate applicant is a source of certificate abuse.

16. The method of claim 11, wherein the step of providing intrusion detection capability at said one or more assigning certificate authorities includes:
implementing a re-keying counter to track occurrences of re-keying; and
checking if the occurrences of re-keying exceed a predetermined threshold.

17. The method of claim 1, where said step of issuing a certificate from the assigning certificate authority further includes selecting a certificate from a pool of certificates shared among a plurality of certificate applicants.

18. The method of claim 1, wherein said step of issuing a certificate from the assigning certificate authority further includes assigning anonymous certificate to the certificate applicant as to maintain an even distribution of certificates among a plurality of certificate applicants.

19. The method of claim 1, wherein said one or more authorizing certificate authorities and said one or more assigning certificate authorities are administered by different operators.

20. The method of claim 1, wherein said one or more authorizing certificate authorities are operated by one or more vehicle suppliers.

21. The method of claim 1, wherein said one or more assigning certificate authorities are operated by one or more agents of a government.

22. The method of claim 1, further including establishing trust relationships among said one or more authorizing certificate authorities and said one or more assigning certificate authorities through a root certificate authority.

23. A program storage device readable by machine, tangibly embodying a program of instructions executable by the machine to perform a method of steps claimed in claim 1.

24. The method of claim 1, wherein the step of routing authentication requests further comprises routing an authentication request with certificate applicant identifying information that is anonymous to the assigning certificate authority, but identifiable by the authorizing certificate authority; and
the step of authorizing certificate requests includes approving the authentication request after authorizing certificate authority performs one or more authorization checks using the certificate applicant identifying information, wherein a transaction identifier is used for each authentication request wherein multiple authorization requests can be sent from the assigning certificate authority and individual authorization responses can be associated with each authentication request.

25. The method of claim 1, further including:
monitoring at said one or more assigning certificate authorities, one or more re-keying rejections made by the authorizing certificate authority.

26. The method of claim 1, further including:
receiving at the assigning certificate authority an indication from the authorizing certificate authority to add to a certificate revocation list, one or more certificates known to the assigning certificate authority for an applicant requesting rekeying.

27. The method of claim 1, further including:
adding one or more certificates to a certificate revocation list at said one or more assigning certificate authorities to provide intrusion detection capability.

28. A system for managing digital certificates in a public key infrastructure comprising:
one or more assigning certificate authorities implemented as one or more computer systems operable to create, manage, and assign a plurality of certificates to one or more certificate applicants that are anonymous to said one or more assigning certificate authorities; and
one or more authorizing certificate authorities implemented as one or more computer systems and separated functionally from said one or more assigning certificate authorities, operable to register certificate applicant identifying information, said one or more authorizing certificate authorities further operable to receive requests for authorizing certificates from said one or more assigning certificate authorities without the authorizing certificate authority receiving requests from any of the one or more certificate applicants, said certificates remaining anonymous to said one or more authorizing certificate authorities.

29. The system of claim 28, wherein said one or more assigning certificate authorities are operable to receive a certificate request from a certificate applicant with identifying information associated with the certificate applicant in a form that remains anonymous to the assigning certificate authority, said one or more assigning certificate authorities further operable to pass the identifying information to said one or more authorizing certificate authorities, wherein said one or more authorizing certificate authorities provide approval or denial based on said identifying information.

30. The system of claim 28, further including:
an intrusion detection module operable to monitor and detect certificate abuse, theft associated with one or more certificate applicants, or combination thereof.

31. A method of assigning certificates for anonymous certificate applicants, comprising:
receiving a certificate request from a certificate applicant only at an assigning certificate authority implemented as a computer system;
receiving applicant identifying information with said certificate request, said applicant identifying information being in a form that remains anonymous to said assigning certificate authority;
sending from the assigning certificate authority an authorization request to an authorizing certificate authority implemented as a computer system with said certificate identifying information without the certificate applicant sending a certificate request to the authorizing certificate authority;
receiving an authorization from said authorizing certificate authority; and
issuing by the assigning certificate authority a certificate to said certificate applicant in response to receiving the authorization, said certificate being anonymous to said authorizing certificate authority.

32. The method of claim 31, further including:
    requesting a list of one or more certificates already owned by said certificate applicant;
    comparing said list of one or more certificates already owned by said certificate applicant with a list of revoked or compromised certificates or both; and
    if a certificate already owned by said certificate applicant is on the list of revoked or compromised certificates or both, determining occurrence of intrusion or misuse or both.

33. A program storage device readable by machine, tangibly embodying a program of instructions executable by the machine to perform a method of steps of claim 31.

34. A method of authorizing certificate requests, comprising:
    registering a plurality of certificate applicant identifying information;
    receiving an authorization request from an assigning certificate authority without the authorizing certificate authority receiving a certificate request from any of the plurality of certificate applicants, said authorization request including an identifying information associated with a certificate applicant, said identifying information being anonymous to said assigning certificate authority;
    determining if said identifying information received from said assigning certificate authority matches one or more of the registered certificate applicant identifying information; and
    authorizing said request from the assigning certificate authority based on the determining step, wherein the assigning certificate authority and the authorizing certificate authority are implemented as one or more computer systems.

35. The method of claim 34, wherein the step of registering certificate applicant identifying information comprises:
    receiving a public key of a public-private key pair generated by a certificate applicant and a message signed with a private key of the public-private key pair at an authorizing certificate authority;
    validating signature of the message using the public key to confirm that the certificate applicant is a holder of the private key at the authorizing certificate authority;
    generating an identifying certificate at the authorizing certificate authority;
    associating the identifying certificate with the certificate applicant at the authorizing certificate authority; and
    sending the identifying certificate to the certificate applicant from the authorizing certificate authority.

36. The method of claim 34, further including:
    determining whether said identifying information received from said assigning certificate authority is associated with theft or misuse or both; and
    authorizing the assigning certificate authority to issue a special certificate to track that can be tracked.

37. A program storage device readable by machine, tangibly embodying a program of instructions executable by the machine to perform a method of steps of claim 34.

* * * * *

UNITED STATES PATENT AND TRADEMARK OFFICE
CERTIFICATE OF CORRECTION

| | |
|---|---|
| PATENT NO. | : 8,635,681 B2 |
| APPLICATION NO. | : 12/012454 |
| DATED | : January 21, 2014 |
| INVENTOR(S) | : Zhang et al. |

It is certified that error appears in the above-identified patent and that said Letters Patent is hereby corrected as shown below:

In the Specification

In Column 8, Line 30, delete "vehicle (520)" and insert -- vehicle (520). --, therefor.

In Column 10, Line 29, delete "form" and insert -- from --, therefor.

In Column 13, Line 7, delete "Machine" and insert -- machine --, therefor.

In the Claims

In Column 14, Line 1, in Claim 2, delete "foiin" and insert -- form --, therefor.

In Column 15, Line 23, in Claim 17, delete "where said" and insert -- wherein said --, therefor.

Signed and Sealed this
Fourth Day of November, 2014

Michelle K. Lee
*Deputy Director of the United States Patent and Trademark Office*